(12) United States Patent
Mariani

(10) Patent No.: US 7,848,544 B2
(45) Date of Patent: Dec. 7, 2010

(54) ROBUST FACE REGISTRATION VIA MULTIPLE FACE PROTOTYPES SYNTHESIS

(75) Inventor: Roberto Mariani, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 968 days.

(21) Appl. No.: 10/511,077

(22) PCT Filed: Apr. 12, 2002

(86) PCT No.: PCT/SG02/00060

§ 371 (c)(1), (2), (4) Date: Apr. 26, 2005

(87) PCT Pub. No.: WO03/088132

PCT Pub. Date: Oct. 23, 2003

(65) Prior Publication Data

US 2006/0233426 A1 Oct. 19, 2006

(51) Int. Cl.
*G06K 9/00* (2006.01)
(52) U.S. Cl. .................................................... 382/118
(58) Field of Classification Search .................. 382/118
See application file for complete search history.

(56) References Cited

U.S. PATENT DOCUMENTS

| 5,991,429 | A | 11/1999 | Coffin et al. | |
|---|---|---|---|---|
| 6,072,894 | A | 6/2000 | Payne | |
| 6,345,109 | B1 | 2/2002 | Souma et al. | |
| 6,879,709 | B2 * | 4/2005 | Tian et al. | 382/118 |
| 6,944,319 | B1 * | 9/2005 | Huang et al. | 382/118 |
| 6,975,750 | B2 * | 12/2005 | Yan et al. | 382/118 |
| 7,221,809 | B2 * | 5/2007 | Geng | 382/280 |

FOREIGN PATENT DOCUMENTS

EP 0 806 739 B1 1/2003

OTHER PUBLICATIONS

DeCarlo et al. The integration of optical flow and deformable models with applications to human face shape and motion estimation. In IEEE Conference on Computer Vision and Pattern Recognition (CVPR), 1996, pp. 231-238.*

* cited by examiner

*Primary Examiner*—Brian Q Le
(74) *Attorney, Agent, or Firm*—Conley Rose, P.C.

(57) ABSTRACT

A face recognition and/or verification system including the step of registering a persons actual face wherein an image of the actual face is captured and synthesized to create a plurality of face prototypes, and wherein the face prototypes are stored for later analysis and comparison with a captured image to be recognized or verified.

25 Claims, 5 Drawing Sheets

ROBUST FACE REGISTRATION VIA MULTIPLE FACE PROTOTYPES SYNTHESIS

FIELD OF THE INVENTION

The present invention is generally directed towards face recognition and face verification systems and in particular towards a facial prototype synthesis system able to generate realistic templates and provides a more robust system for registering a face.

BACKGROUND OF THE INVENTION

The classical face recognition approach is to store an image of a person's face, and then to provide a face matching algorithm robust enough to handle varying lighting conditions, facial expressions, face directions, glasses, beard, mustache and facial hair, etc.

In the area of face recognition technology, research has focused almost entirely on developing algorithms that are invariant to the lighting conditions, the facial expressions and the face direction. Such systems obtain simple databases at the expense of complex matching algorithms or family of algorithms. Alternatively, the face recognition systems based on face template matching and neural networks, require a large number of face samples to train the network to an acceptable standard. The operations that are applied to train neural networks are mainly of linear geometric nature, such as scaling or zooming.

The problems of these techniques is their weakness in dealing with various lighting conditions, changes of expression as well as time difference between the registration and the time of the observation.

For example, WO 99/53427 provides a technique for detecting and recognizing an object in an image frame. The object identification and recognition process uses an image processing technique based on model graphs and bunch graphs that efficiently represent image features as jets. The jets are composed of wavelet transforms and are processed at nodes or landmark locations on an image corresponding to readily identifiable features. The authors thus propose a face representation based on a set of feature points extracted from the face images. Face recognition is then realised using a deformable graph matching technique.

WO 98/37507 discloses that to automatically recognize the face of a person in real time or on the basis of a photo document, a digital image of a side view of the head is produced and a profile curve determined by linear extraction. From the profile curve a strongly reduced quantity of data is generated by evaluation algorithms to serve as a model of the person concerned. This allows for especially simple biometric face identification requiring minimum memory space for the model code.

In general, attempts to improve face recognition have resulted in various methods and algorithms to extract features and compare features with data stored on a database. However, various conditions and circumstances can still lead to less desirable results, and thus an alternative approach is required to improve face recognition.

OBJECT OF THE INVENTION

It is therefore an object of the invention to develop a more robust system that is capable of handling changing conditions such as lighting and facial orientation. In particular it is an object to provide a more robust registration process for such a system.

It is a further object to provide a face synthesis system that is able to generate realistic templates taking into account changing conditions.

SUMMARY OF THE INVENTION

With the above objects in mind the present invention provides in one aspect a face recognition and/or verification system including the step of registering a persons actual face wherein an image of the actual face is captured and synthesized to create a plurality of face prototypes, and wherein the face prototypes are stored for later analysis and comparison with a captured image to be recognised or verified.

The face prototypes may represent possible appearances of the actual face under various lighting conditions, varying facial expressions, varying facial orientations, and/or modeling errors.

In a further aspect the present invention provides a facial prototype synthesis system wherein an image of a persons actual face is synthesized to create a plurality of face prototypes, said face prototypes representing possible appearances of said actual face under various lighting conditions, varying facial expressions, varying facial orientations, and/or modeling errors, and wherein said face prototypes are stored for later use.

In the preferred embodiment the system normalises the captured image such that the eyes are a fixed distance apart and on a horizontal plane. The system may only synthesize the area of the face bounded by the eyebrows and mouth on the assumption that other features such as hair do not significantly alter for recognition and verification purposes. The synthesis may include consideration of alternate eye positions and applying masks to account for changing conditions and errors.

DETAILED DESCRIPTION OF PREFERRED EMBODIMENT

As it can be difficult to achieve accurate face recognition due to factors such as changing lighting conditions, the present invention proposes a method or system which relies on a more intensive registration process.

Most existing systems will capture an image of a person, and store that image for later comparison. In the present invention, during the registration of a person's face, the system automatically synthesizes a multitude of face prototypes, by creating artificial lighting conditions, artificial face morphing and by modeling the errors of a face location system, especially in the eyes detection process. These face prototypes represent the possible appearances of the initial face under various lighting conditions, various expressions and various face orientations, and under various errors of the face location system. The system obtains for each face, a set of faces that spans the possible appearances the face may have.

Having generated this multitude of face prototypes, data analysis can be applied, like dimensionality reduction (principal components analysis), feature extraction, automatic clustering, self-organising map. The design of a face recognition system based on these face prototypes can also be achieved. Face recognition systems based on face templates (pca) and/or feature vectors (gabor wavelet) may be applied, and they may also use these face clusters for training.

Figure 1:
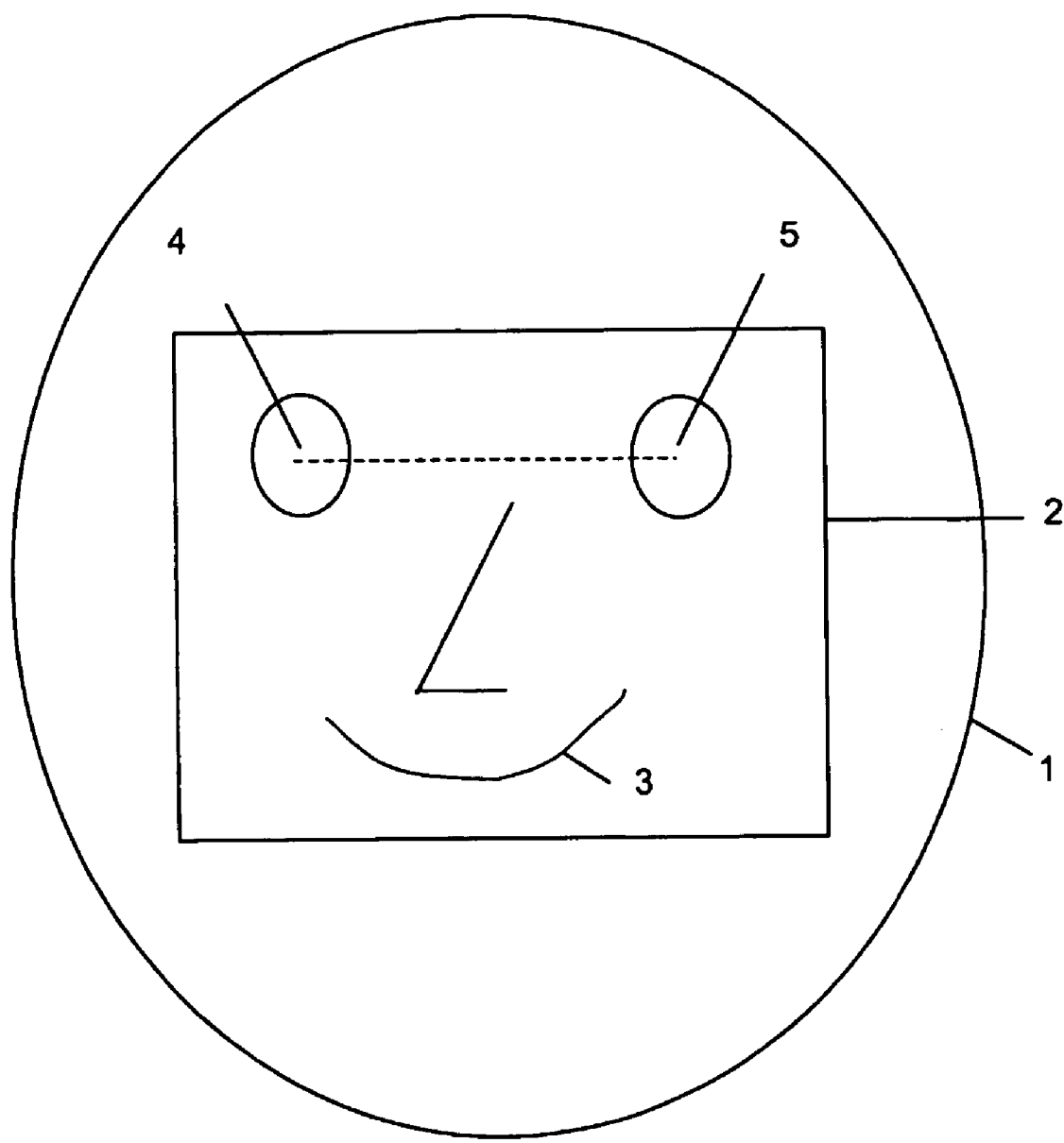
FIG. 1 shows the area of the face analysed in the preferred embodiment.

Considering now an example and referring to the figures. Given an image of a person's face and given the position of the two eyes (4, 5), the preferred system first normalizes the image by setting the two eyes (4, 5) on a horizontal plane and at a fixed distance apart, for example 50 pixels. This operation can be realized by a change of scale and rotation. Once the normalized image is created, the system selects the part of the face that is very stable across time, that is the system does not consider the part of the face above the eyebrows and below the mouth 3. That is, the system considers only the part of the face 1 within the box 2 shown in FIG. 1. Alternatively, other face location systems, may provide the 'face center', from which an estimate of the eyes position can be derived according to human anthropomorphic measures.

Figure 2:
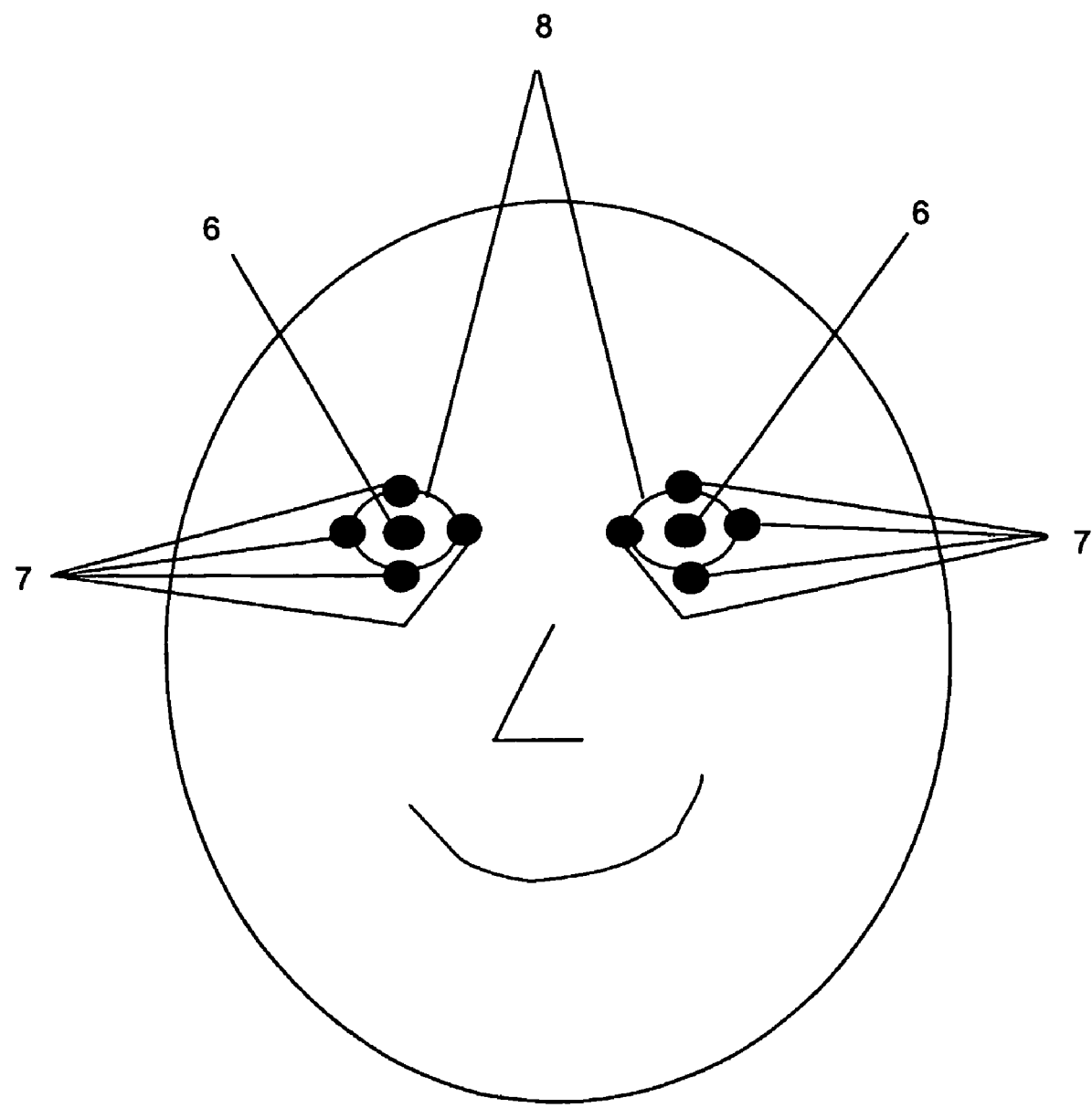
FIG. 2 shows possible eye positions.

Using an existing face location system, it is likely that the eyes' position are imprecise. To propose a robust face encoding system, the present system assumes an error position of the eyes, and for each couple of eyes' positions, the system crops the face accordingly. In practice, the system preferably uses five possible positions per eye, leading to 25 cropped images, as illustrated in FIG. 2. Of course, this number can be changed. By nature, this technique encodes rotation, translation and change of scales, as the scale factor is affected by the distance between the two eyes, and the rotation factor is affected by the angle of the two eyes with the horizontal line. In FIG. 2, the dots 6 are the eyes detected by the system and the dots 7 are the other possible eyes' positions considered for the registration.

The circle 8 shows the surface error that describes the probable real position of the eye. Any point in this circle could be the real eye center. The ray of the surface error is fixed automatically by the system and depends on the interocular distance between the calculated position of both eyes. For example, for 50 pixels eyes distance, we may say that the eye position is precise at −/+5 pixels.

On each of these cropped and normalized images, the system applies predefined 2D lighting masks and predefined 2D warping or morphing masks and obtains a multitude of face prototypes that are likely to appear during the face location. The system preferably uses three families of lighting masks and 25 families of warping masks although varying numbers can be used. Any number of lighting and warping masks could be used, for example desirable results are being obtained using 16 lighting masks.

The system has two kinds of operations that are applied to an input image of a person in order to obtain an output image for storage. Namely, the photometric modification and/or the geometric modification of the image. The photometric modification changes the grey level or the color of a pixel, and the geometric modification modifies the position of this pixel.

The photometric transform can be encoded into the lighting masks and the geometric transform can be encoded into the morphing masks.

The geometric masks can be estimated by various ways, such as manually, semi-automatic or by optical flow estimation between two images. The optical flow estimation is a fully automatic technique exemplified in FIGS. 3 and 4.

Figure 3:
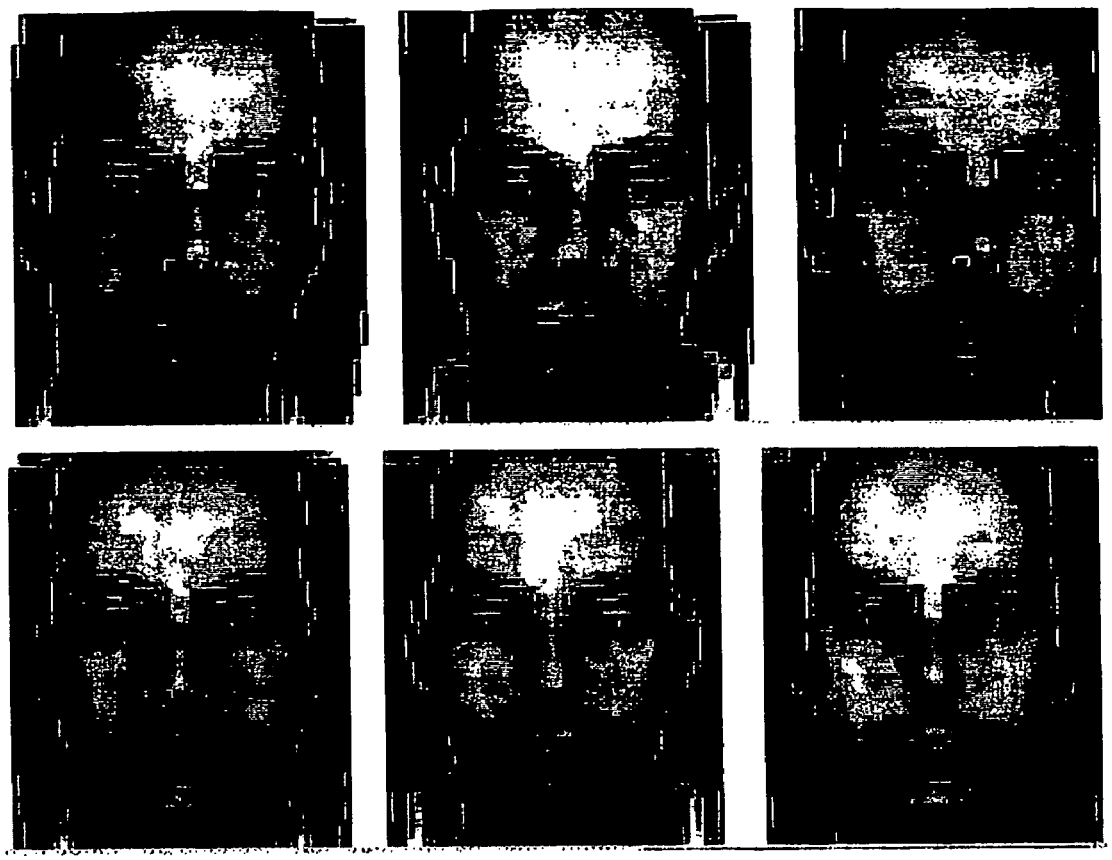
FIG. 3 shows the use of geometric masks.

The first row of FIG. 3 has three original images, and the last row shows the three generated frontal face images obtained using geometric masks. Here the masks are tuned to generate frontal faces.

Figure 4:
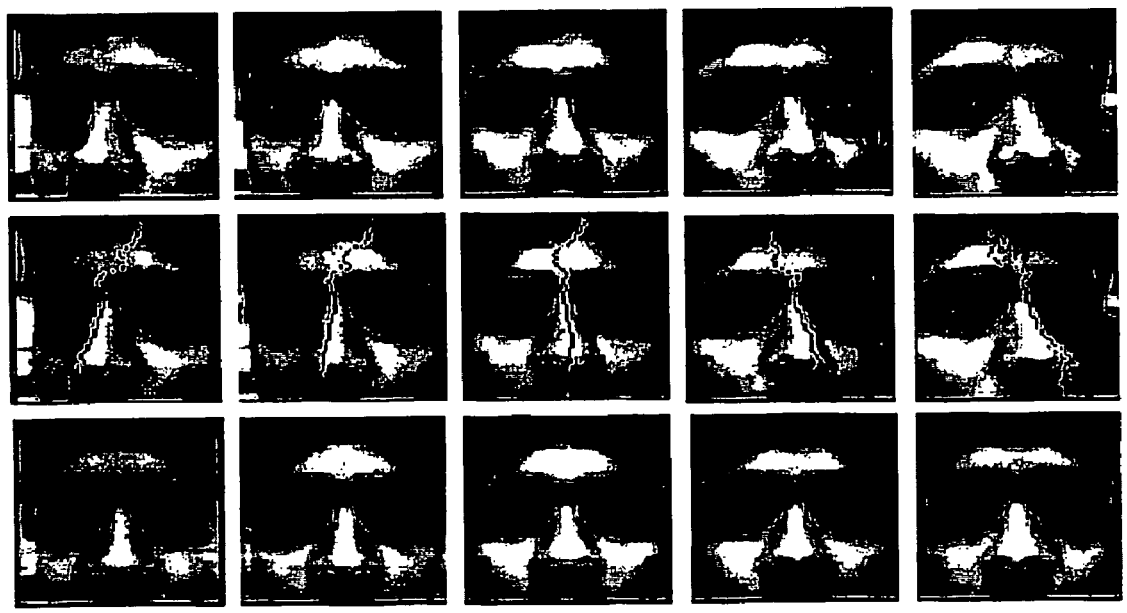
FIG. 4 shows the use of optical flow approximations.

In the same way, the first row of FIG. 4 contains five input images, the second row contains an approximation of the optical flow between each face and its vertical mirror, and the last row contains an approximation of the frontal face, good enough for a robust face recognition.

Here, we describe five photometric masks. Any number can be generated, but in testing these have proved to be very good for robust face registration, as they approximate real lighting conditions.

These preferred marks are:
i) Logarithmic function on grey-level; which obtains brighter images;
ii) Exponential stretch on the function; which obtains darker images;
iii) Vertical shadow that creates vertical half-shadowed faces;
iv) Horizontal shadow that creates horizontal half-shadowed faces; and
v) By differentiating images captured from the camera during the masks settings.

If we consider an input image with grey levels ranging from 0 to 1 after a standard grey level normalization process of the form (v−vmin)/(vmax−vmin), where vmin and vmax are respectively the minimum and maximum grey level values of the image, then each of the preferred masks may be described as follows:

Logarithmic function
Let [Kmin, 255] such that 255>Kmin>0. The system builds the lookup table that contains 256-Kmin entries by computing:
LOGLUT[w]=(log(w)+Kmin)−log(Kmin))/(log(255)−log(Kmin)),
For w=Kmin, . . . 255. The lookup table values are all ranging from 0 to 1. Given the value v of a pixel ranging between 0 and 1, the system obtains the new grey level value w by w=LOGLUT[(255−Kmin)*v+Kmin]; w ranges between 0 and 1 and can use other operators.

Exponential Function
The system builds the lookup table that contains 256 entries by computing:
EXPLUT[w]=(exp(Kmax*w/255.0)−1)/(exp(Kmax)−1)
For w=0, . . . 255. The lookup table values are all ranging from 0 to 1.
Given the value v of a pixel ranging between 0 and 1, the system obtains the new grey level value w by w=EXPLUT[255*v]; w ranges between 0 and 1 and we can use other operators.

Figure 5:
FIG. 5 shows the use of exponential and logarithmic functions.

FIG. 5 shows the input image and the image after applying the exponential function with Kmax=4, and the input image and the image after applying the logarithmic function with Kmin=32. The system could generate an infinite number of such images by making varying Kmin and Kmax.

Vertical Shadow/Horizontal Shadow
As the two processes are identical, we describe only the vertical shadow process for the abscissas x. This function creates a modification of the grey level of a pixel depending on its spatial position in the image. Here we apply it line by line. An infinite number of functions can be used. For the sake of simplicity, we describe one function. Let X be the width of the image, and let $0<\lambda<1$ real coefficient, and let $m=\lambda*X$. We define the following function f(x), depending on the value of $x\in[0,X]$:

$$F(x)=x/m \text{ if } x\in[0,m]$$

$$F(x)=1+(x-m)/(X-m) \text{ if } x\in[m,X].$$

Figure 6:
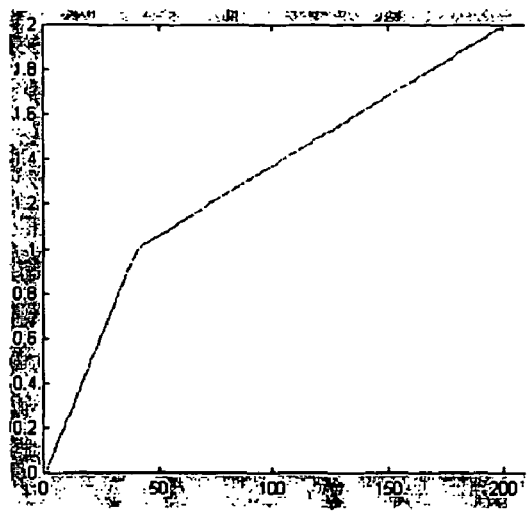
FIG. 6 shows an example function for use with a vertical shadow mask.

Such a function can be seen in FIG. 6. Here X=200 and $\lambda$=0.2. For a given abscissa x, F(x) is a coefficient that varies between [0,2].

Figure 7:
FIG. 7 shows the use of shadow filters.

Given a pixel p=(x,y) with a grey level v, the system obtains in the output image a pixel q=(x,y) with a grey level computed w=v*F(x). Thus, the m first pixels will become darker, the first one at position 0, totally dark, the mth pixel will be unaffected (in FIG. 6, the $40^{th}$ pixel 200*0.2=40), and the pixels at abscissa greater than m will become brighter. FIG. 7 illustrates the process with 5 different shadow filters, from the left original image.

The horizontal process applies to the ordinate y, and uses the height of the image Y, in exactly the same manner.

2D masks as combination of two 1D masks.

Here we define a mask F such that F(x,y)=Fx(x)*Fy(y). For each pixel p=(x,y) with grey level v, we obtain the new grey level w=v*F(x,y).

2D masks.

Figure 8:
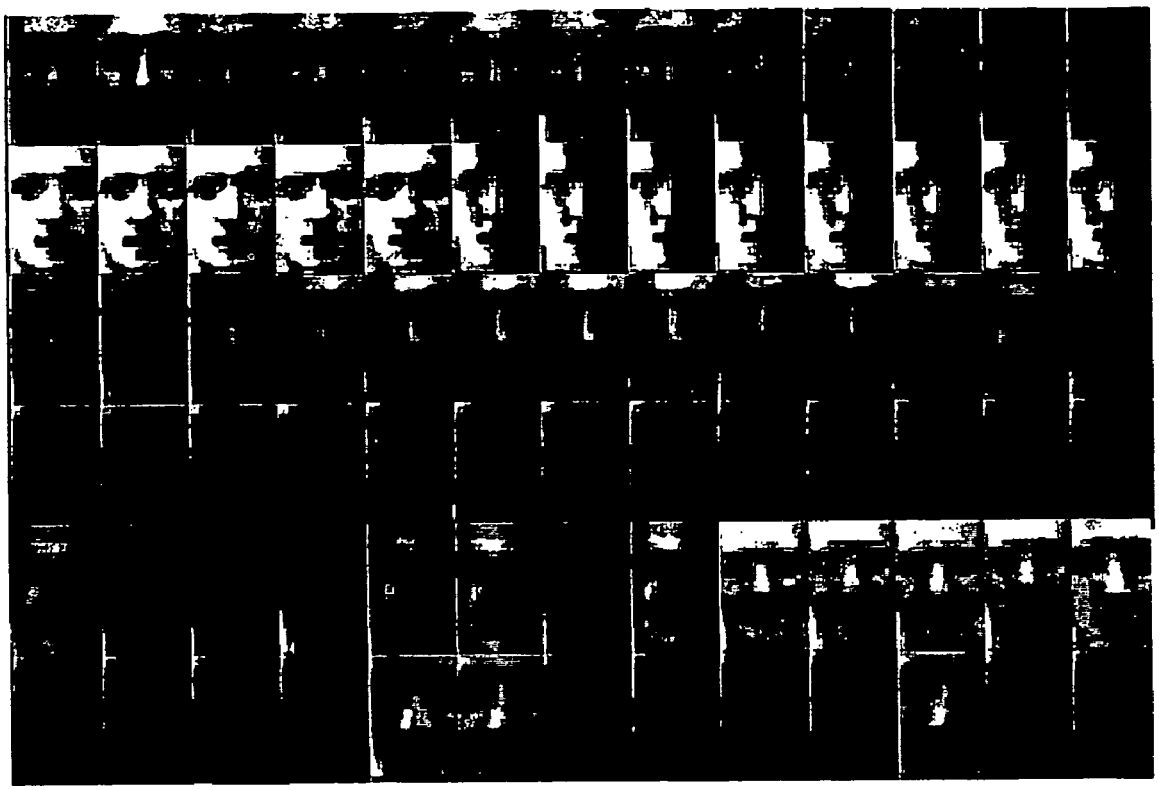
FIG. 8 shows an example of manual lighting masks.

These masks are a generalization of the previous monodimensional masks, and a coefficient is defined for each pixel F(x,y). The system then obtains a 2D mask that modifies the value v of the pixel p=(x,y), in w=v+F(x,y). These masks can be built manually, by capturing several identical images and by changing the lighting conditions of the room during the image capture. In such a case, if we define the neutral image as I, and all the other images as $I_1, I_2, \ldots, I_N$, the system derives N masks by differentiating I with $I_1, I_2, \ldots, I_N$: and we obtain $F_1=I-I_1, F_2=I-I_2, \ldots, F_N=I-I_N$. Thus, we modify the value of the pixel p=(x,y), in w=v+F(x,y). FIG. 8 illustrates a face capture where the light varies to set up manual lighting masks, by differentiating with the first image. Once again, these masks can be normalized between 0 and 1.

Filter Cascading

A synthetic prototype can be obtained by applying several masks to the original normalized image. Let I be the original normalized image, $F=\{F_1, F_2, \ldots, F_N\}$ the set of successive masks, and O the obtained synthetic prototype. We have $O=F_N(\ldots F_2(F_1(I))\ldots)$. In some specific cases, we may have $F_N(\ldots F_2(F_1(I))\ldots)=Fn(\ldots F2(F1))(I)=M(I)$, leading to a much more efficient computation, as the mask $M=F_N(\ldots F_2(F_1)\ldots)$ can be estimated in advance by a combination of masks.

Figure 9:
FIG. 9 shows an example of registering a user in accordance with the preferred embodiment of the present invention.

FIG. 9 illustrates images obtained during the registration of a user. In this example the preferred system took the 5 leftmost (first column) images to register robustly this person, at a resolution of 15×15 pixels. The grey levels intensity of each image have been re-normalized between 0 and 255.

This set of generated faces could be used in any application using faces as if it was produced online by any camera or video input devices. For example, it can be used in face recognition, face verification, face feature extraction, face retrieval, video conferencing systems, neural network or auto-associative memory training, etc.

By storing multiple possible appearances of the same face, the system increases the probability of retrieving the correct face across lighting conditions, expressions and face directions. The system therefore compensates for the weaknesses of previous methods although does obtain a more complex database.

The system does increase the probability of confusion with another face, but experiments have shown that the best match between two identical persons is statistically higher than the best match between two different persons. As these transforms are applied identically to all the faces, all are penalized or favored in the same way, which is enough to justify this experimental fact. In other words, it is more likely that the registration transforms the face into a future observed face of the same person, than it transforms someone else's face into this future observed face.

The system extends the representations to non-linear geometric transformations and non-linear photometric transformations, to synthesize realistic face prototypes. This is equivalent to an expansion of the training set for a better generalization of the neural network. The key of this robust registration is to apply allowable transformation to the face image, using face morphing and applying synthesized lighting conditions that approach reality. These transformations are applied to a face for which the eyes coordinates are already known. Another key issue is that the registration process considers errors in the positioning of the eyes that are due to the eyes detection algorithm.

Given a face image and the two eyes positions, the present system is able to synthesize realistic faces from a single face, to provide a robust registration which in turn leads to a robust face recognition/verification algorithm. The consideration of errors in eyes detection, the synthesize of the lighting effects, as well as the face morphing can use pre-registered masks. Their combination allows the creation of a multitude of synthetic faces that are likely to be encountered during the future face recognition tasks.

The subsequent face retrieval algorithm can be straightforward, as the registration process has undertaken most of the difficulties.

The invention has been particularly described with reference to face recognition systems to assist in the understanding of the invention. However, the present invention proposes a way to generate artificial and likely face prototypes from a single face, by creating artificial light effects, artificial face direction and by modeling the localization errors of a face location system, for the purpose of robust face feature extraction or robust face registration. That is the present invention is a facial prototype synthesis system, that generates automatically realistic templates from a single image and not merely a face recognition system. Lighting conditions masks, warping masks and eyes position errors are used to achieve a robust face generation.

Apart from improving face recognition systems the present invention could also be used to improve current face recognition and face verification systems, by transforming and expanding the existing databases containing the faces of the people, automatically, without recapturing all the photos, under all the face directions, all the lighting conditions, all the scales and rotations.

The present invention therefore proposes a way to generate artificial and likely face prototypes from a single face, by creating artificial light effects, artificial face direction and by modeling the localization errors of a face location system, for the purpose of robust face feature extraction or robust face registration.

Whilst the method and system of the present invention has been summarised and explained by illustrative example it will be appreciated by those skilled in the art that many widely varying embodiments and applications are within the teaching and scope of the present invention, and that the examples presented herein are by way of illustration only and should not be construed as limiting the scope of this invention.

The invention claimed is:

1. A face prototype synthesis method performed by an automated image processing system, the method comprising:

providing an image of a person's face to the automated image processing system, said image of the person's face comprising a plurality of pixels, said image of the person's face including pixels corresponding to a first eye and pixels corresponding to a second eye on the person's face;

automatically creating a plurality of cropped images based upon said image of the person's face in accordance with a plurality of predetermined facial positions for a center position of the first eye and a plurality of predetermined facial positions for a center position of the second eye, each cropped image within the plurality of cropped images including pixels corresponding to the first eye and pixels corresponding to the second eye, each cropped image within the plurality of cropped images corresponding to a different facial position for at least one of a center position of the first eye and a center position of the second eye with respect to another cropped image within the plurality of cropped images;

automatically creating a plurality of face prototype images by applying a set of lighting masks and a set of warping masks to each cropped image within the plurality of cropped images, each face prototype image within the plurality of face prototype images including pixels corresponding to the first eye and pixels corresponding to the second eye, each face prototype image within the plurality of face prototype images representing a possible appearance of the person's face; and storing the plurality of face prototype images for later analysis and comparison with a captured image to be recognised or verified, wherein creating the plurality of cropped images, creating the plurality of face prototype images, and storing the plurality of face prototype images are performed by the automated image processing system.

2. A face prototype synthesis method performed by an automated image processing system, the method comprising:

providing an image of a person's actual face to the automated system, said image of the person's actual face including pixels corresponding to a first eye and pixels corresponding to a second eye within a pair of eyes; and automatically registering said image of a person's actual face by performing the steps of:

normalizing said image of the person's actual face by applying at least one of translational, rotational, and scalar transformation to said image of the person's actual face;

determining alternative facial positions for each eye so as to compensate for possible eye position modeling errors;

producing cropped images of said image of the person's actual face, based upon the determined alternative facial positions for each eye; and creating a plurality of face prototypes using said cropped images, said face prototypes representing possible appearances of the person's actual face under modeling errors corresponding to errors in a detected position of a pair of eyes on the face, and possible appearances of the person's actual face under various lighting conditions, varying facial expressions, or varying facial orientations.

3. The method as claimed in claim 1, further comprising comparing said plurality of face prototypes images and said captured image using a face matching algorithm.

4. The method as claimed in claim 1, further comprising comparing said plurality of face prototypes images and said captured image using face templates or feature vectors.

5. The method as claimed in claim 1, further comprising generating a normalized image of the person's face based on a spatial relationship between at least two features said image of the person's face.

6. The method as claimed in claim 5, wherein generating the normalized image of the person's face includes aligning the first and second eyes of said image of the person's face to a horizontal plane.

7. The method as claimed in claim 5, wherein generating the normalized image of the person's face includes scaling said image of the person's face such that the first and second eyes are a fixed distance apart.

8. The method as claimed in claim 7, wherein said first and second eyes are fixed at 50 pixels apart.

9. The method of claim 5, wherein the first eye and the second eye define a pair of eyes, and wherein each cropped image within the plurality of cropped images indicates a unique facial position for the pair of eyes with respect to the normalized image and each other cropped image within the plurality of cropped images.

10. The method as claimed in claim 1 wherein the each cropped image within the plurality of cropped images excludes facial areas above the person's eyebrows and below the person's mouth.

11. The method as claimed in claim 1, wherein the plurality of cropped images indicates five alternative positions for each eye.

12. The method as claimed in claim 1 wherein applying a set of lighting masks to each cropped image within the plurality of cropped images comprises applying multiple families of lighting masks to each cropped image within the plurality of cropped images.

13. The method as claimed in claim 12, wherein three to 16 predefined lighting masks are applied to each cropped image within the plurality of cropped images, each predefined lighting mask corresponding to a distinct illumination condition for the person's face.

14. The method as claimed in claim 1 wherein applying a set of warping masks to each cropped image within the plurality of cropped images comprises applying multiple families of warping masks to each cropped image within the plurality of cropped images.

15. The method as claimed in claim 14, wherein 25 predefined warping masks are applied to each cropped image within the plurality of cropped images.

16. The method as claimed in claim 12, wherein said multiple families of lighting masks includes a photometric transform.

17. The method as claimed in claim 14, wherein said multiple families of warping masks includes a geometric transform.

18. The method as claimed in claim 17, wherein said geometric transform is estimated using optical flow estimation.

19. The method as claimed in claim 16, wherein said photometric transform includes at least one of:

algorithmic function, exponential stretch, vertical shadow, horizontal shadow and differentiating image.

20. The method of claim 1, wherein automatically creating the plurality of cropped images compensates for facial modeling errors.

21. The method of claim 20, wherein automatically creating the plurality of cropped images compensates for possible eye center position errors arising from eye center position determination imprecision associated with a face location system.

22. The method of claim 1, wherein each cropped image within the plurality of cropped images indicates a distinct probable real position on the person's face for the first eye and a distinct probable real position on the person's face for the second eye.

23. The method of claim 1, wherein each cropped image within the plurality of cropped images is a two dimensional image.

24. The method of claim 1, wherein the set of lighting masks is applied identically to each cropped image within the plurality of cropped images.

25. The method of claim 1, wherein the set of morphing masks is applied identically to each cropped image within the plurality of cropped images.

* * * * *